US010360407B2

(12) United States Patent
Gordon et al.

(10) Patent No.: US 10,360,407 B2
(45) Date of Patent: *Jul. 23, 2019

(54) AUTHOR ANONYMIZATION (71) Applicant: INTERNATIONAL BUSINESS MACHINES CORPORATION, Armonk, NY (US)

(72) Inventors: Itai Gordon, Modiin (IL); Peter Hagelund, Princeton, NJ (US); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,349

(22) Filed: Apr. 10, 2017

(65) Prior Publication Data
US 2017/0250959 A1 Aug. 31, 2017

Related U.S. Application Data (63) Continuation of application No. 15/053,044, filed on Feb. 25, 2016.

(51) Int. Cl.
G06F 21/62 (2013.01)
G06F 17/24 (2006.01)
G06F 17/27 (2006.01)
G06N 20/00 (2019.01)
H04L 29/06 (2006.01)

(52) U.S. Cl.
CPC .......... G06F 21/6254 (2013.01); G06F 17/24 (2013.01); G06F 17/274 (2013.01); G06F 17/2765 (2013.01); G06F 21/6263 (2013.01); G06N 20/00 (2019.01); H04L 63/0407 (2013.01); H04L 63/0421 (2013.01)

(58) Field of Classification Search
CPC .............. G06F 21/6254; G06F 17/274; G06F 17/2765; H04L 63/0421
See application file for complete search history.

(56) References Cited

U.S. PATENT DOCUMENTS 8,473,451 B1 * 6/2013 Hakkani-Tur .......... G06F 21/00
707/602
8,473,452 B1 6/2013 Ober et al.
(Continued)

OTHER PUBLICATIONS

Narayanan, Arvind; Paskov, Hristo; Gong, Neil Zhenqiang; Bethencourt, John; Stefanov, Emil; Shin, Eui Chul Richard; Song, Dawn; "On the Feasibility of Internet-Scale Author Identification", Symposium on Security and Privacy, IEEE, May 20-23, 2012, pp. 300-314.*
(Continued)

Primary Examiner — Victor Lesniewski
(74) Attorney, Agent, or Firm — Michael O'Keefe (57) ABSTRACT Embodiments of the present invention disclose a method, computer program product, and system for text author anonymization for de-identification of written text. This may be used to replace written text after learning text author writing characteristics, such frequently written terms, grammar patterns, grammar errors, and writing tone. Portions of the written text which may identify the text author may be replaced, for example the text author writing characteristics, social status, geographical location, and specific organization.

20 Claims, 4 Drawing Sheets

(56) References Cited

U.S. PATENT DOCUMENTS

| | | | |
|---|---|---|---|
| 8,479,094 B2 | 7/2013 | Fouts | |
| 8,621,090 B2 | 12/2013 | Bustamente | |
| 9,047,488 B2 | 6/2015 | Allen et al. | |
| 9,116,877 B2* | 8/2015 | Chandramouli | G06F 17/2785 |
| 9,183,290 B2 | 11/2015 | Griffith | |
| 2002/0112011 A1* | 8/2002 | Washington | G06Q 10/00 709/206 |
| 2003/0005312 A1* | 1/2003 | Sato | G04F 21/6254 713/189 |
| 2005/0076089 A1* | 4/2005 | Fonseca | H04L 12/1859 709/206 |
| 2006/0179073 A1* | 8/2006 | Kimura | G06F 21/6245 |
| 2007/0288458 A1* | 12/2007 | Kacmarcik | G06F 17/274 |
| 2008/0104128 A1* | 5/2008 | Drayer | G06F 21/6245 |
| 2009/0018820 A1* | 1/2009 | Sato | G06F 17/2775 704/9 |
| 2009/0199185 A1* | 8/2009 | Slawson | G06Q 10/06 718/100 |
| 2009/0313274 A1* | 12/2009 | Chen | G06F 17/274 |
| 2012/0254333 A1* | 10/2012 | Chandramouli | G06F 17/27 709/206 |
| 2013/0041652 A1 | 2/2013 | Zuev et al. | |
| 2013/0138428 A1* | 5/2013 | Chandramouli | G06F 17/274 704/9 |
| 2013/0247214 A1 | 9/2013 | Cormode et al. | |
| 2013/0289984 A1* | 10/2013 | Hakkani-Tur | G06F 21/00 704/235 |
| 2014/0136941 A1* | 5/2014 | Avrahami | G06F 21/6245 715/229 |
| 2014/0188891 A1* | 7/2014 | Nath | G06F 17/30613 707/741 |
| 2014/0310346 A1* | 10/2014 | Deng | H04L 67/22 709/204 |
| 2014/0344356 A1 | 11/2014 | Ramadhan | |
| 2014/0351943 A1* | 11/2014 | Gianniotis | G06F 21/6254 726/26 |
| 2015/0006149 A1* | 1/2015 | Bonas | G06F 17/2795 704/9 |
| 2015/0347391 A1* | 12/2015 | Chen | G06F 17/274 704/9 |
| 2016/0019402 A1* | 1/2016 | Khandelwal | H04L 67/306 726/26 |
| 2017/0155611 A1* | 6/2017 | Ashoori | H04L 51/28 |
| 2017/0228591 A1* | 8/2017 | Simske | G06Q 99/00 |

OTHER PUBLICATIONS

Khonji, Mahmoud; Iraqi, Youssef; "Stylometric Anonymity: Is Imitation The Best Strategy?", Trustcom/BigDataSE/ISPA, IEEE, Aug. 20-22, 2015, pp. 974-982.*

IBM: List of IBM Patents or Patent Applications Treated as Related (Appendix P), Apr. 12, 2017, pp. 1-2.

Gordon, et al., Pending U.S. Appl. No. 15/053,044, filed Feb. 25, 2016, titled "Author Anonymization", pp. 1-31.

Brennan et al., "Adversarial Stylometry: Circumventing Authorship Recognition to Preserve Privacy and Anonymity", ACM Transactions on Information and System Security, vol. 15, No. 3, Article 12, Publication date: Nov. 2012, This research was supported by Intel through the ISTC for Secure Computing and by DARPA through grant N10AP20014, pp. 12:1-12:22.

Nirkhi et al., "Comparative study of Authorship Identification Techniques for Cyber Forensics Analysis", (IJACSA) International Journal of Advanced Computer Science and Applications, vol. 4, No. 5, 2013, pp. 32-35.

McDonald et al., "Use Fewer Instances of the Letter "i": Toward Writing Style Anonymization", PETS'12, Proceedings of the 12th international conference on Privacy Enhancing Technologies, 20 pages, Jul. 2012.

Stamatatos, "A Survey of Modern Authorship Attribution Methods", Journal of the American Society for Information Science and Technology, vol. 60, Issue 3, Mar. 2009, pp. 1-28.

Mechti et al., "Author Profiling Using Style-based Features", Notebook for PAN at CLEF 2013, ANLP Research Group—MIRACL Laboratory, University of Sfax, Tunisia, 7 pages.

Mattern, "Degrees of De-identification of Clinical Research Data", Journal of Clinical Research Best Practices, vol. 7, No. 11, Nov. 2011, "Can You Handle the Truth?", 6 pages.

Scholarly Open Access, "Five Ways to Defeat Automated Plagiarism Detection", Critical analysis of scholarly open-access publishing, Printed on Dec. 10, 2015, pp. 1-6.

Schneier on Security, "Identifying People by their Writing Style", https://www.schneier.com/blog/archives/2011/08/identifying_peo_ 2.html, Printed on Dec. 10, 2015, pp. 1-13.

De Vel et al., "Mining Email Content for Author Identification Forensics", ACM SIGMOD record, vol. 30, Issue 4, Dec. 2001, 10 pages.

Pearl et al., "Detecting authorship deception: a supervised machine learning approach using author writeprints", Literary and Linguistic Computing Advance Access published Mar. 7, 2012, pp. 1-14.

Stanko et al., "Whose Book is it Anyway? Using Machine Learning to Identify the Author of Unknown Texts", 2013, Computer Science Department, Stanford University, Stanford, CA 94305, 5 pages.

Ramyaa et al., "Using Machine Learning Techniques for Stylometry", Conference: Proceedings of the International Conference on Artificial Intelligence, IC-AI '04, vol. 2 & Proceedings of the International Conference on Machine Learning; Models, Technologies & Applications, MLMTA '04, Jun. 21-24, 2004, Las Vegas, Nevada, USA, 7 pages.

Wikipedia, "Stylometry", From Wikipedia, the free encyclopedia, https://en.wikipedia.org/wiki/Stylometry, Printed on Dec. 10, 2015, pp. 1-5.

* cited by examiner

AUTHOR ANONYMIZATION

BACKGROUND

The present invention relates generally to a method, system, and computer program product for writers to be anonymous, and more particularly to a method, system, and computer program product for de-identification of written text.

Writers develop a writing style which may help to identify themselves, such as using common phrasing or writing style and consistently misspelling specific words. Information such as geographic and naming conventions may also help to identify writers. Writers may wish to be anonymous when sharing information they have written, for example when participating in a survey. When a writer is aware that their writing will be anonymized they may be more revealing or open in their responses when participating in a survey. Anonymizing written text can include using a standardized language and substituting alternate language when common phrasing is used.

Organizations may desire to know the opinion of their employees, customers and members in order to improve performance. An example may be a survey of employees of an organization. An employee may not provide candid feedback because they are concerned that their writing style may identify themselves in the survey. This may be of special concern in a small organization or sub-category of an organization.

Herein the terms "text" and "written text" are not limited to so-called "text messages," such as are commonly sent via mobile phone, for example. Rather, the terms may refer to writings, in general, regardless of format, how produced or how transmitted. Likewise, the term "text author" refers to the author of a writing.

SUMMARY

Embodiments of the present invention disclose a method, computer program product, and system for text author anonymization. A method embodiment includes intercepting a text from a text author, learning text author writing characteristics, where the text author writing characteristics includes frequently written terms, grammar patterns, grammar errors, and writing tone, identifying a portion of the text where the portion of the text identifies the text author by personal information where the personal information includes the text author writing characteristics, social status, geographical location, and specific organization, and replacing the portion of the text based on the portion of the text identifying the text author.

According to another embodiment, a computer program product for text author anonymization is provided, the computer program product includes one or more computer-readable storage media and program instructions stored on the one or more computer-readable storage media, the program instructions including program instructions to intercept a text from a text author, program instructions to learn text author writing characteristics, where the text author writing characteristics includes frequently written terms, grammar patterns, grammar errors, and writing tone, program instructions to identify a portion of the text where the portion of the text identifies the text author by personal information where the personal information includes the text author writing characteristics, social status, geographical location, and specific organization, and program instructions to replace the portion of the text based on the portion of the text identifying the text author.

According to another embodiment, a computer system for text author anonymization is provided, the computer system including one or more computer processors, one or more computer-readable storage media, and program instructions stored on the one or more computer-readable storage media for execution by at least one of the one or more processors, the program instructions including program instructions to intercept a text from a text author, program instructions to learn text author writing characteristics, where the text author writing characteristics includes frequently written terms, grammar patterns, grammar errors, and writing tone, program instructions to identify a portion of the text where the portion of the text identifies the text author by personal information where the personal information includes the text author writing characteristics, social status, geographical location, and specific organization, and program instructions to replace the portion of the text based on the portion of the text identifying the text author.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on distinctive features or elements of various embodiments of the present invention.

Writers develop a writing style which may help to identify themselves, such as using common phrasing or writing style and consistently misspelling specific words. Information such as geographic and naming conventions may also help to identify writers. Writers may wish to be anonymous when sharing information they have written, for example when participating in a survey. When a writer is aware that their writing will be anonymized they may be more revealing or open in their responses when participating in a survey. Anonymizing written text can include using a standardized language and substituting alternate language when common phrasing is used.

Organizations may desire to know the opinion of their employees, customers and members in order to improve performance. An example may be a survey of employees of an organization. An employee may not provide candid feedback because they are concerned that their writing style may identify themselves in the survey. This may be of special concern in a small organization or sub-category of an organization.

A way to anonymize the author of written text is to replace parts of the text while preserving the meaning of the text. An embodiment by which to replace parts of the text is described in detail below by referring to the accompanying drawings in FIGS. 1 to 4. Those skilled in the art will readily appreciate that the detailed description given herein with respect to these figures is for explanatory purposes as the invention extends beyond these limited embodiments.

A text writer may need to write text anonymously and not be identified from their style of writing, usage of words or phrases, or expression of tone, such as a positive tone or an aggressive tone in the written text. The text writer may need to write anonymously in a myriad of situations, for example, when writing a review of a business on-line, such as a restaurant or a store, or when providing an opinion in a community forum, such as for the government or a political party, or for any organization such as a gym or a church.

There may be a business value for an organization to employ a text anonymizer for feedback provided on the organization website or other location where the organization is requesting feedback. The text anonymizer allows its text writer or user to express what they are really thinking without being identifiable to the organization and the organization could benefit from knowing the truth and improvements needed for improvement. The organization can identify on the location requesting feedback that any text written will be anonymized. The organization can also provide the anonymized text for the text writer review and approval.

Figure 1:
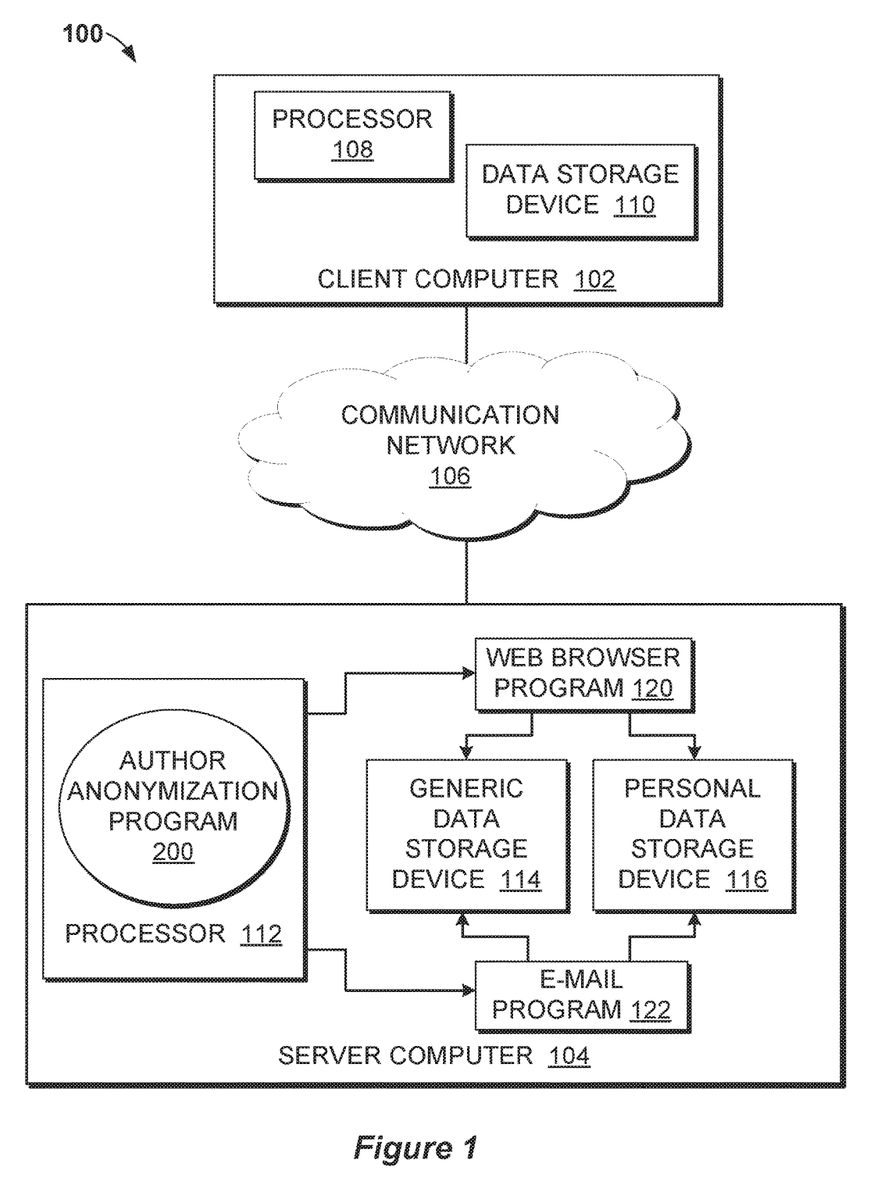
FIG. 1 is a functional block diagram illustrating author anonymization in a networked computer environment, in accordance with an embodiment of the present invention.

Referring now to FIG. 1, a functional block diagram illustrating a system 100 for author anonymization in a networked computer environment, in accordance with an embodiment of the present invention is shown. The system 100 may include a client computer 102 and a server computer 104. The client computer 102 may communicate with the server computer 104 via a communications network 106 (hereinafter "network"). The client computer 102 may include a processor 108 and a data storage device 110, and is enabled to interface with a user and communicate with the server computer 104. The server computer 104 may include a processor 112, a generic data storage device 114 and a personal data storage device 116 which are enabled to run an author anonymization program 200, a web browser program 120 and an e-mail program 122. The generic data storage device 114 may contain information which can help identify a person generally, such as town names, people names, school names, company names, among other general information. One instance of the information may not be enough to identify a person or organization. However when combined, and with each additional instance of information from the generic data storage device 114, the likelihood of identifying a particular individual or organization may increase. This information may be collected from web sites, blogs, and other social media. An administrator may manage the generic data storage device 114 and may configure the generic data storage device 114 to include sensitive information which pertains to a company or business to protect trade secrets or privacy.

The personal data storage device 116 may contain personal identifying information for a particular user, such as name, address, place of employment, a hobby, membership in a church, political, fraternal, social, or sporting organization, among other personal identifying information. There may be individual files which may be organized as a database of known identifying information and stored in the personal data storage device 116. The author anonymization program 200 may create an individual file per each learned user and assign a unique identifier to associate the individual file to the learned user. The unique identifier may be internally known in the database of known identifying information that is stored in the personal data storage device 116 for additional privacy. A typical use of the author anonymization program 200 may be a human resources department of a company conducting a survey, and the human resources department would like a comment field to be anonymous. The human resources department may have a generic data storage device 114 containing information such as names, company division names and company acronyms. In addition, the same company may have a second generic data storage device 114 for the law department, and so on for other departments of the company.

The author anonymization program 200 may run on the web browser program 120, while a user is utilizing a web browser. The web browser program 120 may have access to both the generic data storage device 114 and the personal data storage device 116. The author anonymization program 200 may run on the e-mail program 122, while a user is utilizing e-mail. The e-mail program 122 may have access to both the generic data storage device 114 and the personal data storage device 116. The author anonymization program 200 may run on any program the user may be using to write text, in addition to the web browser and the e-mail.

In an embodiment, the client computer 102 may operate as an input device including a user interface while the author anonymization program 200, the web browser program 120 and the e-mail program 122 may run primarily on the server computer 104. In an alternative embodiment, the author anonymization program 200, the web browser program 120 and the an e-mail program 122 may run primarily on the client computer 102 while the server computer 104 may be used for processing a storage of data used by the author anonymization program 200, the web browser program 120 and the e-mail program 122. The author anonymization program 200, the web browser program 120 and the e-mail program 122 may each run on either the server computer 104 or the client computer 102. The generic data storage device 114 and the personal data storage device 116 may reside on the client computer 102, the server computer 104, or on a combination of both.

It should be noted, however, that processing for the author anonymization program 200, the web browser program 120 and the e-mail program 122 may, in some instances be shared amongst the client computer 102 and the server computer 104 in any ratio. In another embodiment, the author anonymization program 200, the web browser program 120 and the an e-mail program 122 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 4, the client computer 102 and the server computer 104 may each include internal and external components.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In an embodiment, the system 100 may include any number of client computers 102 and/or server computers 104; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The author anonymization program 200 and associated methods are described and explained in further detail below with reference to FIGS. 2-4.

Figure 2:
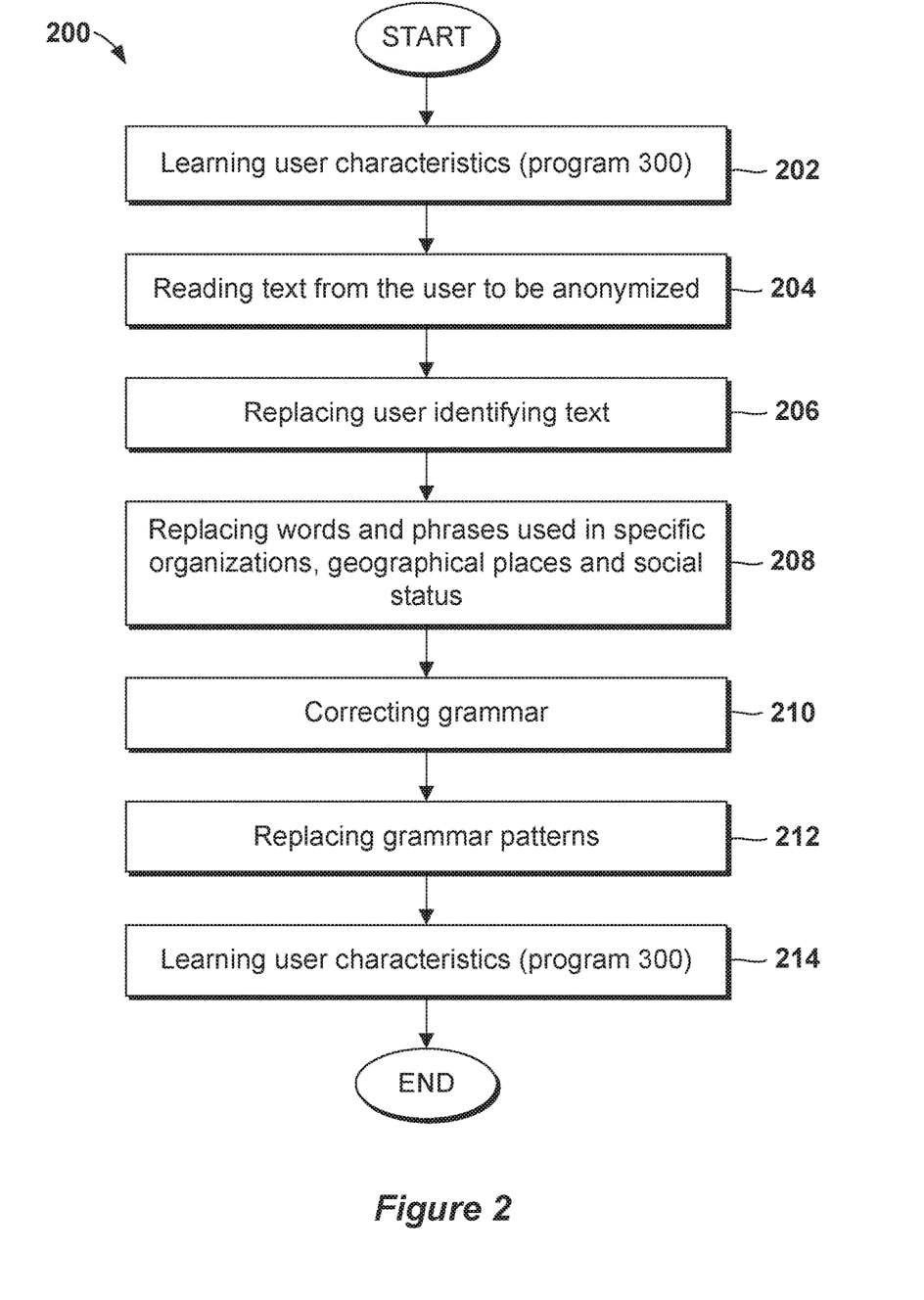
FIG. 2 is a flowchart depicting operational steps of the author anonymization program within the data processing environment of FIG. 1, in accordance with an embodiment of the present invention.

Referring now to FIG. 2, a flowchart depicting operational steps of the program 200 for author anonymization, in accordance with an embodiment of the present invention, is shown.

First, a program 300 for learning user characteristics is executed, at step 202. The program 300 is described in detail below and in reference to FIG. 3. In an embodiment, the user may be a new user, and information from the program 300 is not available, thus the program 200 may continue to step 204.

Next, the program 200 reads text from the user which is to be anonymized, at step 204. In an embodiment, the program 200 may be configured to run on the user's laptop, smart phone or other device. The program 200 may intercept a text in real time after the text is written and prior to sending via an e-mail or a free text field on a web page, or other location the text may be written to. Alternatively, the program 200 may be activated by the user prior to writing text. The program 200 may be activated by the user prior to submitting text, possibly configured to run via a pull down menu, or may be configured to run for all text written by the user. Another possible way to activate the program 200 may be by selecting a button to select the program 200 to run. The program 200 may be controlled and turned on and off by the user, for example a configuration setting on an internet browser. Also, program 200 may be configured to obtain text from a file of the user, such as a word processing file on the user's device.

In an alternate embodiment, the program 200 may be configured to run on a system at the location where the text is to be received, such as a company web page for a survey or an input field for a business requesting customer feedback. For example, an employee survey is run on an internet browser. When an employee has a free text field to fill out, the program 200 may read a text from the user to be anonymized at step 204. Similarly to the above described embodiment, the program 200 may intercept a text in real time after the text is written and prior to accepting the input of the text, via an e-mail or a free text field on a web page, or other location the text may be written to. Alternatively, the program 200 may be activated by the user prior to writing text, or prior to submitting text, possibly configured to run via a pull down menu, or may be configured to run for all text written. Alternatively the program 200 may be activated by selecting a button to run it. The program 200 may be controlled and turned on and off by the user, or may be controlled and turned on and off by the owner of the web site or other location where text is being received.

Then the program 200 may replace user identifying text, at step 206. Identifying text may include personal information, such as a name, name of a town, name or location of a school, or other identifying information. The program 200 may compare words and combinations of words to a database of known identifying information using known natural language processing, such as natural language understanding. The database of known identifying information may be stored, for example, on the generic data storage device 114 as shown in FIG. 1 and described above. The generic data storage device 114 may be, continuously updated and added to, based on learned characteristics from both the program 200 and the program 300, using known analytics and data mining. The program 300 is discussed below with reference to FIG. 3. In an embodiment, the program 300 may be run on a known user and additional personal information may have been collected on the known user in the personal data storage device 116 as shown in FIG. 1 and described above in reference to FIG. 1. In this embodiment, the program 200 may compare words and combinations of words and partial words, such as in a wildcard qualified term, in the text to the personal data storage device 116. A wildcard qualified term is a symbol that strands for one or more unspecified characters, for example, used in searching text. In a further embodiment, if the user is an unknown user, the program 200 may trigger the program 300 to begin learning user characteristics of the unknown user, and storing the information on the personal data storage device 116. Identifying text may be replaced by generic words, for example specific names of people may be replaced by her or he, names of a school may be generalized to the word school. The generic data storage device 114 and the personal data storage device 116 may contain a replacement word or combination of words for an identifying text, and can be continuously updated and improved via usage patterns of words selected by the user to replace the identifying words. The generic data storage device 114 and the personal data storage device 116 may each individually or combined be referred to as a database of replacement text.

Additional identifying text may be the tone of the user, for example the level of confidence used when writing. For example, the user may write in a confident tone, such as "I'm sure that", and this can be replaced with "I think that", and vice-versa.

Then the program 200 may replace words and phrases used in specific organization, geographical places and social status, at step 208, using known natural language processing, such as natural language understanding. This information may be stored in the generic data storage device 114 as well as words and phrases that are commonly used in specific organization, geographical places and social status. An organization, or a business may have unique jargon and acronyms that can help to identify the user, and the program 200 can replace the jargon and spell out acronyms to help anonymize the user. The names of geographical places can also be changed or removed as well. The generic data storage device 114 may be continuously updated and added to, using known analytics and data mining. The generic data storage device 114 may contain the extended words for an acronym and may contain a replacement word or words for an identifying text, for example the specific name of a business unit, and can be continuously updated and improved via usage patterns of words selected by the user to replace the identifying words.

A user may also unknowingly identify their social status by use of particular words, which can be replaced by the program 200. The generic data storage device 114 may be continuously updated by crawling the web and extracting text from public social media and blogs. The information in the data storage device 114 may help to identify information in text written by the user which may characterize the writer, such has information on their name, their gender, their home address, where they work, live, groups they belong to, including social, religious, athletic, educational, etc. The program 200 may use an external program, which provides benefits such as exploring data, providing predictive analytics and creating dashboards to help identify words or phrases which may be associated with specific organizations, geographical places, social status, and other identifying groups of people. An example of an external program which explores data, provides predictive analytics and creates dashboards may be IBM Watson® Analytics. All brand names and/or trademarks used herein are the property of their respective owners.

Next the program 200 may replace any grammatical errors, at step 210. A user may commonly misspell particular words, which may help to identify the user. For example, a user may commonly misspell words such as absence, effect, occurrence, license, etc. The grammar corrections may be done using an existing word processing program which may edit and format the text.

Then the program 200 may replace any grammar patterns which may identify the user, at step 212. Grammar patterns may include phrases such as, 'in other words', 'in terms of', 'when it comes to', and other phrases, and may be stored in the generic data storage device 114. The user may be a frequent user of a grammar pattern, and an organization or location may have grammar patterns which are frequently used, and this information may be stored in the personal data storage device 116. The program may also replace words that are not commonly used by the user and are used incorrectly. The replacement of grammar and word patterns may be performed using known analytics and data mining and both the generic data storage device 114 and the personal data storage device 116 may contain suggest word and word combination alternatives for common phrasing, and can be continuously updated and improved via usage patterns of words selected by the user to replace the identifying words.

In an embodiment, the program 200 may suggest alternate words on a rotating basis, to help anonymize the text. In an alternative embodiment, the program 200 may be set by a database administrator with a weighed percentage of how often to change text and a weighed percentage of how often to change the text to different substitute text. For example, the phrase 'in other words', may be assigned a 50% value to change this combination of words half of the time. In addition, the substitute text 'alternatively' may be the replacement text 50% of the time, and the substitute text 'to put it another way' may be the replacement text 50% of the time.

Next the program 200 performs learning of the user characteristics, using program 300, at step 214. This step is a repeat of step 202, but in step 214 it will be run on the modified text, and check if the text has characteristics to identify the user as identified in step 202. This step is to check the program 200 has de-identified, or anonymized the user. If step 214 highlights that the user is identifiable, the program 200 may be repeated to further anonymize the user, or the writer of the text. This may be performed using natural language processing and known analytics.

The program 200 for author anonymization may utilize external databases and programs, for example an on-line dictionary service, which may analyze large amounts of text to create a dictionary of contextually related words. For example, IBM Watson® Concept Expansion may be used. For example, the on-line dictionary service may tie the 'The Big Apple' to New York City, and understand that 'getting in touch' means communicating by email, letter, or phone.

The program 200 may change portions of the text. The program 200 may suggest changes to the user, which the user can approve or disapprove. In an embodiment, a part of the text which is suggested to have alternative text may show up highlighted in the text area where the user is writing the texting. When the user clicks on the highlighted text, the program 200 may provide a suggested alternate text or a pull-down menu of different possible alternative text. The user may then click on the text without making any changes to the test, or may click and select an alternative text.

An example follows. An enterprise has an employee survey with a free text field requesting feedback regarding possible improvements. An employee may be unwilling to express any possible criticism of the enterprise even if their name is not exposed to their manager who reads it, due to concern that the manager may identify the employee from reading the text. The program 200 may replace parts of the text that might identify themselves. Thus by using the program 200, the employee can be more forthcoming in their comments.

The program 200 may also be used by individuals rather than organizations. The user can build their personal profile by running the program 300, allowing the program 300 access to written text by the user. This may be useful when the user wants to provide comments to a smaller community and remain anonymous.

The program 200 may be used by a user to create an inverse profile, where the inverse profile has different characteristics than the user. The user may identify characteristics he wishes to convey, perhaps inverse to their own characteristics, and modify their written text to accommodate these characteristics. For example a user may wish to convey an unprofessional, low confidence persona, and the program 200 can change his original text to expose these characteristics. The program 200 may change from correct word usage to incorrect word usage, and change "I am sure" with "I think", etc. The user may be able to access the personal data storage device 116 and identify substitute text for specific words or phrases. In this embodiment, the program 200 may have the additional step of replacing text as identified in the personal data storage device 116 with the alternate text.

In an alternate embodiment, a program which analyzes words based on their frequency of occurrence in social media may be used to confirm that written text resonates better to other written text in a community. This would insure word usage and phrasing 'fits in' and the user does not stand out and may identify alternate phrasing of text that aligns with phrasing used in the community. For example, the phrase "IBM is leveraging in innovation to build a smarter planet" may be changed to "IBM is investing in innovation to build a smarter planet". The program used to confirm the written text is comparable to other written text in the community.

The program which analyzes words based on their frequency of occurrence may be a program such as the IBM Message Resonance Service may be used.

Figure 3:
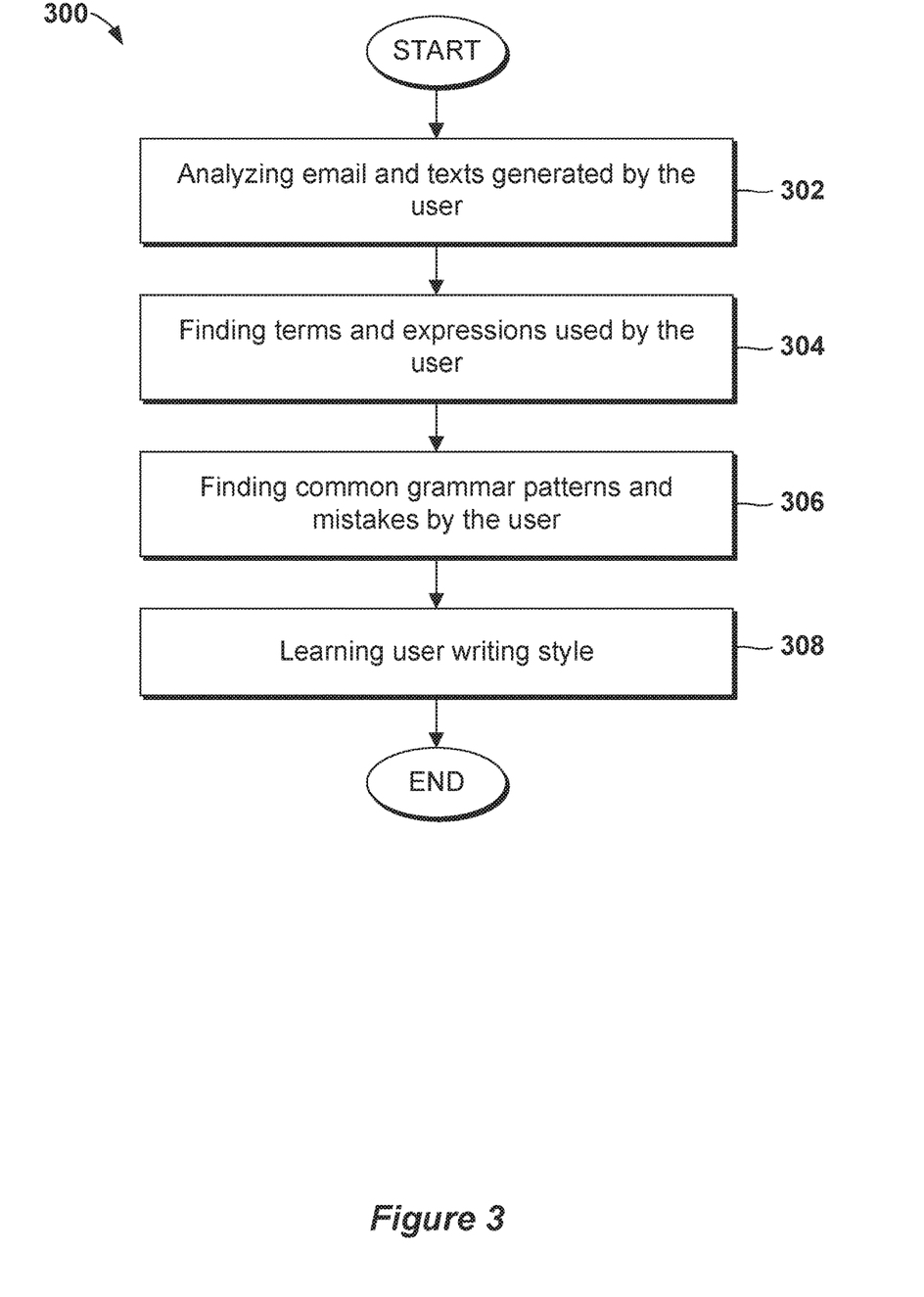
FIG. 3 is a flowchart depicting operational steps of the learning user characteristics program within the data processing environment of FIG. 1, in accordance with an embodiment of the present invention.

Referring now to FIG. 3, a flowchart depicting operational steps of the program 300 for learning user characteristics, in accordance with an embodiment of the present invention, is shown. First, analysis may be done at step 302 of emails and other user-generated text by collecting the emails, etc. The analysis may include use of known data mining techniques. Text generated by the user may include Facebook® posts, Twitter® Tweets®, blogs, comments, other social media updates. This information may be stored in the personal data storage device 116.

Next, the program 300 finds frequently written terms and expressions used by the user at step 304, using known natural language processing and analytics of the user text. Examples of common phrasing may include 'for all intents and purposes', 'to tell the truth', 'honestly', 'irregardless' instead of 'regardless', 'nip it in the bud', 'hocus-pocus', 'the handwriting on the wall', 'OK', 'raining cats and dogs', 'fit as a fiddle', 'similarly', 'furthermore', 'likewise', 'as well as', 'another thing to remember', 'on the other hand', 'provided that', 'all things considered', 'going forward', 'in other words', 'alternatively', and abbreviations such as 'ft' for foot for feet, 'mi' for miles, 'min' for minutes, 'no' for number, 'rev' for revision, 'NP' for no problem. Each of these phrases and abbreviations may be frequently used by a particular author and could be used to help identify the user. The frequent terms and expressions used by the user may be stored in the personal data storage device 116.

Then the program 300 finds common grammar patterns and mistakes in text written by the user using an existing word processing program at step 306. Common grammar patterns and mistakes by be repeated by the user and may also help to identify the user. Common grammar mistakes may include misplaced apostrophes, misuse of your and you're, misuse of there, their and they're, misuse of to, too and two, among other mistakes. The common grammar patterns and mistakes used by the user may be stored in the personal data storage device 116.

Next the program 300 may learn user or text author writing style or characteristics, such as the tone of the writing at step 308, by using common data mining and known natural language processing, for example sentiment analysis. The writing tone is generally conveyed though the choice of words or the viewpoint. A writers tone may be confident, positive, negative, aggressive or passive, to name a few examples, and can be reflected in their word choice. When people write, they may commonly write either in the first, second or third person. Writing in the first person may include use of "I", "me", "my" and "we". Writing in the second person may include use of "you" and "your". Writing in the third person may include use of "he", "she" and "it". Writers may also develop a style, for example, writing a question and then answering the question. Writers may be prone to using exclamations points, or using several exclamation points in a row. The user writing style or characteristics may be stored in the personal data storage device 116.

Program 300 may use linguistic analysis of digital communications for learning user characteristics, including preferences of the user, An external program may perform some of all of the steps performed by program 300. An example of an external program for learning user characteristics is The IBM Watson® User Modeling API (application program interface) may be used to perform analysis of text generated by the user.

Figure 4:
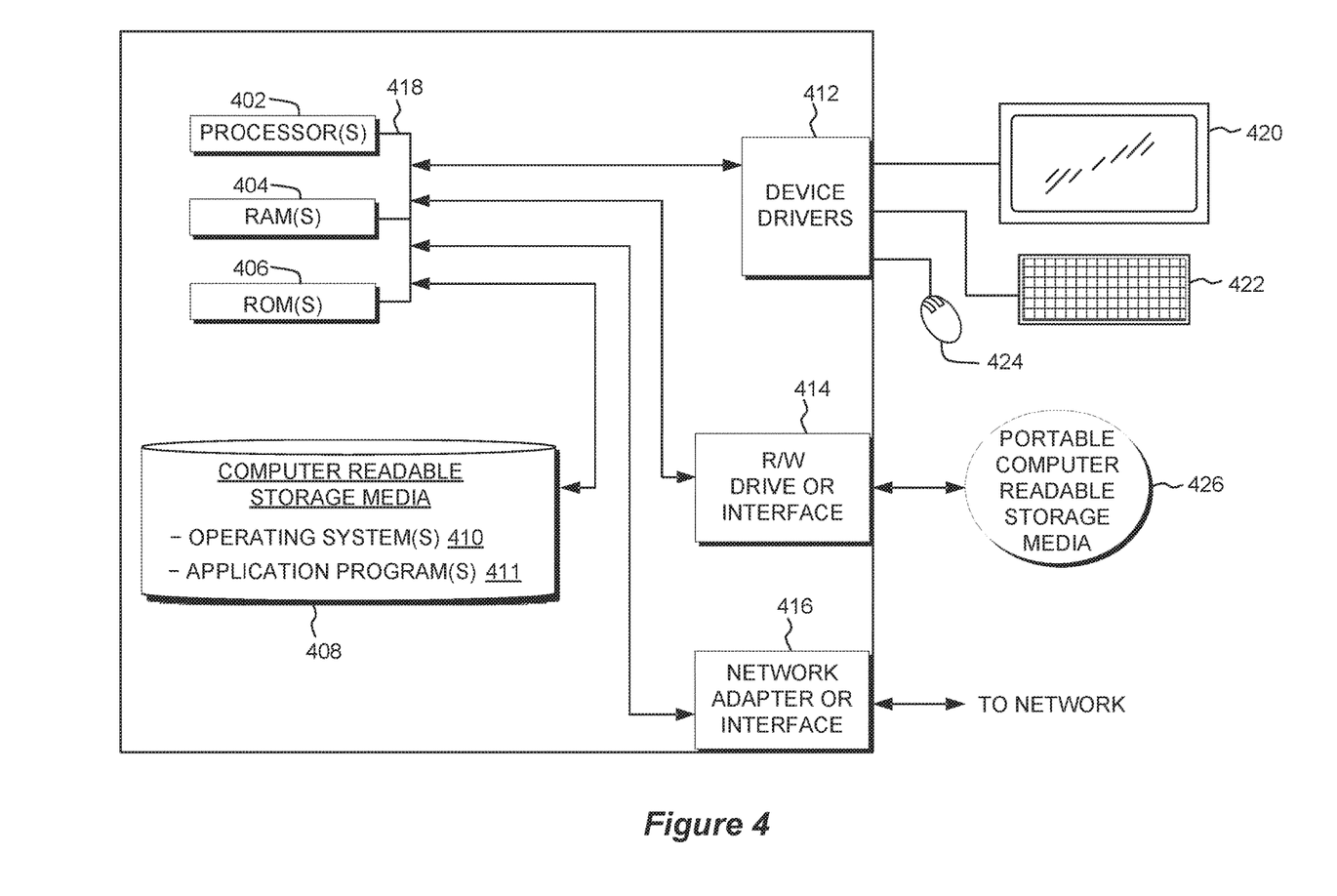
FIG. 4 is a functional block diagram of components of the proxy server computer executing the author anonymization program, in accordance with an embodiment of the present invention.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of one implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the author anonymization program 200, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include a network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for text author anonymization used during participation in an employee survey, the computer program product comprising:
one or more computer-readable storage media and program instructions stored on the one or more computer-readable storage media, the program instructions comprising:
program instructions to intercept a text in the employee survey from a text author, wherein the text author is responding to a question in the employee survey;
providing a text author anonymization activation selection button to the text author;
confirming text author anonymization activation from the selection button;
program instructions to learn text author writing characteristics using natural language processing, data mining, known analytics, and linguistic analysis by comparing words and combinations of words to a database of known identifying information, wherein the text author writing characteristics comprises frequently written terms, grammar patterns, grammar errors, and writing tone;
program instructions to identify a portion of the text using natural language processing, predictive analytics and linguistic analysis of digital communications of the text author wherein the portion of the text identifies the text author by personal information wherein the personal information comprises the text author writing characteristics, social status, geographical location, and specific organization;
program instructions to create a dictionary of contextually related words by analyzing words based on their frequency of occurrence in social media and on-line dictionary services;
program instructions to suggest replacement text to the text author by replacing the portion of the text based on the portion of the text identifying the text author with substitute text from the dictionary using known natural language processing, wherein the substitute text comprises continuously updated generic text generated by known analytics and data mining, wherein the substitute text identities an inverse profile, wherein the text author identifies alternate writing characteristics of the inverse profile, wherein the substitute text comprises rotating alternate substitute words with a database administrator assigned weighed percentage of substitution percent;
program instructions to allow the text author to approve the alternate text;
program instructions to learn text author writing characteristics of the replaced portion of the text using natural language processing, data mining, known analytics, and linguistic analysis by comparing words and combinations of words to a database of known identifying information; and
depending on the learned text author writing characteristics of the replaced portion of the text, program instructions to replace the portion of the text for a second time.

2. The computer program product according to claim 1, wherein program instructions to learn the text author writing characteristics further comprises:
program instructions to analyze text generated by the text author;
program instructions to find terms and expressions used by the text author;
program instructions to find common grammar patterns generated by the text author;
program instructions to find common grammar mistakes by the text author;
program instructions to learn a writing style of the text author; and
program instructions to store the learned text author writing characteristics in the database of known identifying information, wherein the database of known identifying information includes the learned text author writing characteristics for at least one text author.

3. The computer program product according to claim 1, wherein program instructions to replace the portion of the text further comprises:
    program instructions to compare the portion of the text which identifies the text author to a database of replacement text;
    program instructions to identify alternate text in the database of replacement text; and
    program instructions to replace the portion of the text with the identified alternate text.

4. The computer program product according to claim 1, wherein the personal information further comprises:
    text author name, text author gender, text author home address, text author place of employment, text author work location, text author school name, text author school location, and text author organization membership.

5. The computer program product according to claim 1, further comprising:
    program instructions to compare the replaced portion of the text to the learned text author writing characteristics; and
    program instructions to confirm the replaced portion of the text does not identify the text author.

6. The computer program product according to 1, further comprising:
    program instructions to include sensitive information in the database of known identifying information.

7. The computer program product according to claim 1, wherein the database of known identifying information comprises an alternate portion of text for the portion of text which identifies the text author, wherein the alternate portion of text is the replacement text.

8. The computer program product according to claim 1, further comprising:
    program instructions to store learned text author writing characteristics to the database of known identifying information.

9. A computer program product for text author anonymization used during participation in a customer survey, the computer program product comprising:
    one or more computer-readable storage media and program instructions stored on the one or more computer-readable storage media, the program instructions comprising:
    program instructions to intercept a text in the customer survey from a text author, wherein the text author is responding to a question in the customer survey;
    program instructions to learn text author writing characteristics using natural language processing, data mining, known analytics, and linguistic analysis by comparing words and combinations of words to a database of known identifying information, wherein the text author writing characteristics comprises frequently written terms, grammar patterns, grammar errors, and writing tone;
    program instructions to identify a portion of the text using natural language processing, predictive analytics and linguistic analysis of digital communications of the text author, wherein the portion of the text identifies the text author by personal information wherein the personal information comprises the text author writing characteristics, social status, geographical location, and specific organization;
    program instructions to create a dictionary of contextually related words by analyzing words based on their frequency of occurrence in social media and on-line dictionary services;
    program instructions to suggest replacement text to the text author by replacing the portion of the text based on the portion of the text identifying the text author with substitute text from the dictionary using known natural language processing, wherein the substitute text comprises continuously updated generic text generated by known analytics and data mining, wherein the substitute text identities an inverse profile, wherein the text author identifies alternate writing characteristics of the inverse profile, wherein the substitute text comprises rotating alternate substitute words with a database administrator assigned weighed percentage of substitution percent;
    program instructions to allow the text author to approve the alternate text;
    program instructions to learn text author writing characteristics of the replaced portion of the text using natural language processing, data mining, known analytics, and linguistic analysis by comparing words and combinations of words to a database of known identifying information; and
    depending on the learned text author writing characteristics of the replaced portion of the text, program instructions to replace the portion of the text for a second time.

10. The computer program product according to claim 9, wherein program instructions to learn the text author writing characteristics further comprises:
    program instructions to analyze text generated by the text author;
    program instructions to find terms and expressions used by the text author;
    program instructions to find common grammar patterns generated by the text author;
    program instructions to find common grammar mistakes by the text author;
    program instructions to learn a writing style of the text author; and
    program instructions to store the learned text author writing characteristics in the database of known identifying information, wherein the database of known identifying information includes the learned text author writing characteristics for at least one text author.

11. The computer program product according to claim 9, wherein program instructions to replace the portion of the text further comprises:
    program instructions to compare the portion of the text which identifies the text author to a database of replacement text;
    program instructions to identify alternate text in the database of replacement text; and
    program instructions to replace the portion of the text with the identified alternate text.

12. The computer program product according to claim 9, wherein the personal information further comprises:
    text author name, text author gender, text author home address, text author place of employment, text author work location, text author school name, text author school location, and text author organization membership.

13. The computer program product according to claim 9, further comprising:

program instructions to compare the replaced portion of the text to the learned text author writing characteristics; and program instructions to confirm the replaced portion of the text does not identify the text author.

14. The computer program product according to claim 9, further comprising:

program instructions to include sensitive information in the database of known identifying information.

15. A computer program product for text author anonymization used when providing on-line feedback, the computer program product comprising:

one or more computer-readable storage media and program instructions stored on the one or more computer-readable storage media, the program instructions comprising:

program instructions to intercept a text when providing on-line feedback from a text author to be input into an online community;

program instructions to learn the text author writing characteristics using natural language processing, data mining, known analytics, and linguistic analysis by comparing words and combinations of words to a database of known identifying information, wherein the text author writing characteristics comprises frequently written terms, grammar patterns, grammar errors, and writing tone;

program instructions to compare text author writing characteristics using natural language processing, data mining, known analytics, and linguistic analysis by comparing words and combinations of words to a database of known identifying information, wherein the text author writing characteristics comprises frequently written terms, grammar patterns, grammar errors, and writing tone, to writing characteristics of previous entries of the online community;

program instructions to identify a portion of the text which identifies the text author using natural language processing, predictive analytics and linguistic analysis of digital communications of the text author, with different writing characteristics of the online community;

program instructions to create a dictionary of contextually related words by analyzing words based on their frequency of occurrence in social media and on-line dictionary services;

program instructions to provide suggested alternate text for the portion of the text to the text author from the dictionary using known natural language processing, wherein the substitute text comprises continuously updated generic text generated by known analytics and data mining, wherein writing characteristics of the suggested alternate text match the writing characteristics of the online community wherein the substitute text identities an inverse profile, wherein the text author identifies alternate writing characteristics of the inverse profile, wherein the substitute text comprises rotating alternate substitute words with a database administrator assigned weighed percentage of substitution percent;

program instructions to allow the text author to approve the alternate text;

program instructions to learn text author writing characteristics of the replaced portion of the text using natural language processing, data mining, known analytics, and linguistic analysis by comparing words and combinations of words to a database of known identifying information; and program instructions to replace the portion of the text with the suggested alternate text, based on the text author approval.

16. The computer program product according to claim 15, wherein program instructions to learn the text author writing characteristics further comprises:

program instructions to analyze text generated by the text author;

program instructions to find terms and expressions used by the text author;

program instructions to find common grammar patterns generated by the text author;

program instructions to find common grammar mistakes by the text author;

program instructions to learn a writing style of the text author; and program instructions to store the learned text author writing characteristics in the database of known identifying information, wherein the database of known identifying information includes the learned text author writing characteristics for at least one text author.

17. The computer program product according to claim 15, wherein program instructions to replace the portion of the text further comprises:

program instructions to identify a portion of the text wherein the portion of the text identifies the text author by personal information wherein the personal information comprises the text author writing characteristics, social status, geographical location, and specific organization;

program instructions to compare the portion of the text which identifies the text author to a database of replacement text;

program instructions to identify alternate text in the database of replacement text; and program instructions to replace the portion of the text with the identified alternate text.

18. The computer program product according to claim 17, wherein the personal information further comprises:

text author name, text author gender, text author home address, text author place of employment, text author work location, text author school name, text author school location, and text author organization membership.

19. The computer program product according to claim 15, further comprising:

program instructions to compare the replaced portion of the text to the learned text author writing characteristics; and program instructions to confirm the replaced portion of the text does not identify the text author.

20. The computer program product according to claim 15, further comprising:

program instructions to include sensitive information in the database of known identifying information.

* * * * *